(12) United States Patent
Royse

(10) Patent No.: US 6,367,865 B1
(45) Date of Patent: Apr. 9, 2002

(54) SEAL FOR LOW TOLERANCE CONFRONTING SURFACES FORMING LOW CLEARANCES IN A VEHICLE

(75) Inventor: Marion A. Royse, Maryville, TN (US)

(73) Assignee: Schlegel Corporation, New York, NY (US)

( * ) Notice: Subject to any disclaimer, the term of this patent is extended or adjusted under 35 U.S.C. 154(b) by 0 days.

(21) Appl. No.: 09/665,647

(22) Filed: Sep. 19, 2000

(51) Int. Cl.[7] .................................................. B60J 1/18
(52) U.S. Cl. ..................... 296/146.9; 296/901; 49/475.1
(58) Field of Search ........................ 296/146.9, 190.11, 296/203.03, 207, 146.5, 901; 49/502, 475.1, 483.1

(56) References Cited

U.S. PATENT DOCUMENTS

| | | | |
|---|---|---|---|
| 3,035,863 A | * 5/1962 | Hottle | |
| 3,726,559 A | * 4/1973 | Wilfert et al. | |
| 4,405,173 A | 9/1983 | Piano | |
| 4,769,951 A | 9/1988 | Kaaden | |
| 4,892,348 A | * 1/1990 | Nozaki | |
| 4,936,621 A | * 6/1990 | Shimoda et al. | 296/207 |
| 5,013,379 A | 5/1991 | Brooks et al. | |
| 5,106,149 A | * 4/1992 | Glossop, Jr. et al. | |
| 5,168,670 A | 12/1992 | Umeda | |
| 5,199,761 A | 4/1993 | Dannecker et al. | |
| 5,262,114 A | 11/1993 | Boyce et al. | |
| 5,472,258 A | * 12/1995 | Meguro et al. | 296/146.9 |
| 5,511,344 A | 4/1996 | Dupuy | |
| 5,557,890 A | 9/1996 | Levy et al. | |
| 5,558,741 A | 9/1996 | Balcerski et al. | |
| 5,570,922 A | * 11/1996 | DeRees et al. | 296/146.9 X |
| 5,636,895 A | 6/1997 | Ito et al. | |
| 5,651,578 A | 7/1997 | Mistopoulos et al. | |
| 5,671,565 A | 9/1997 | Furuse | |
| 5,749,176 A | 5/1998 | Heim et al. | |
| 5,904,002 A | 5/1999 | Emerling et al. | |

* cited by examiner

Primary Examiner—Joseph D. Pape
(74) Attorney, Agent, or Firm—Brian B. Shaw, Esq.; Stephen B. Salai, Esq.; Harter, Secrest & Emery LLP

(57) ABSTRACT

A seal for providing a sealed interface between confronting surfaces having a reduced clearance in at least one relative position of the confronting surfaces. The seal is particularly configured for components movable between a first and a second position wherein the components provide relatively low clearances, typically about 6 mm, or less, in the first position.

29 Claims, 4 Drawing Sheets

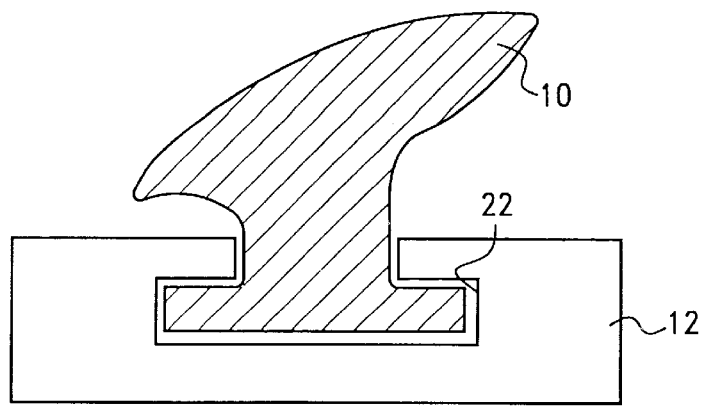
FIG.6
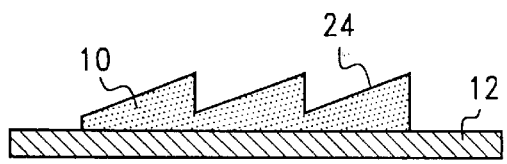 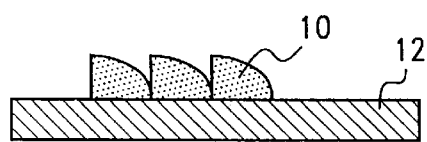
FIG.7         FIG.8
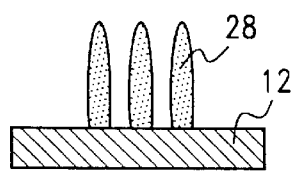 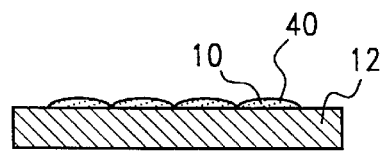
FIG.9         FIG.10
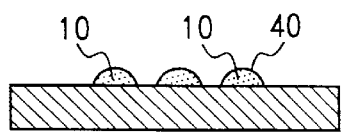 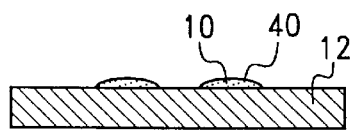
FIG.11        FIG.12
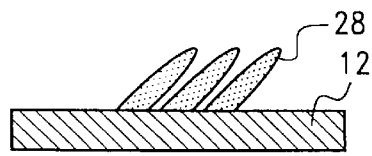 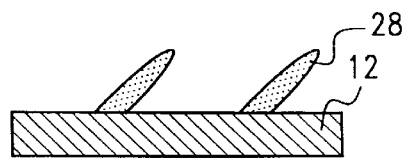
FIG.13        FIG.14

SEAL FOR LOW TOLERANCE CONFRONTING SURFACES FORMING LOW CLEARANCES IN A VEHICLE

FIELD OF THE INVENTION

The present invention relates to seals for operable location between confronting surfaces, and more particularly, to a seal for use in cooperation with low tolerance components with a relatively high engagement force, wherein the clearance between the components is relatively small. The present invention may be particularly configured for applications in automotive vehicles.

BACKGROUND OF THE INVENTION

Seals are employed in numerous applications to reduce or inhibit the migration of environmental elements as well as noise across an interface. Seals must accommodate a variety of factors such as intended operating environment parameters, performance specifications and the tolerances of the relevant components and the resulting clearances to be sealed.

Traditional car door seals have been required to accommodate relatively large manufacturing tolerances as much as 12 mm or more. To address these relatively large tolerances, prior designs have employed a two component seal, wherein a first component of the seal is constructed to engage a portion of either the body or the door. A remaining portion of the seal provides a sealing interface and includes a generally hollow, bulbous or highly compressible portion sized to accommodate the clearance between the components as well as tolerances in the bulb.

Typically, a vehicle component such as a door would be manufactured with a nominal 12 mm gap, wherein an acceptable gap can be as large as 17 mm. Thus, as seal designs have developed, they have been required to accommodate the relatively large clearances or gaps between the confronting surfaces to be sealed.

However, developments in automotive design and manufacture are leading to reduced clearances. In addition, the tolerances in confronting surfaces are decreasing. Therefore, existing seals and seal constructions are incompatible with low tolerance and/or low clearance confronting surfaces that may become available in the automotive industry. Thus, a need exists for a seal design and construction that can accommodate confronting surfaces having a clearance of approximately 6 mm or less. The need also exists for a seal that can be operably located and retained in a low clearance environment.

SUMMARY OF THE INVENTION

Manufacturing techniques and materials developments have advanced so that traditional clearances of approximately 12 mm or more may no longer be accepted in the industry. Manufacturing ranges may provide a resulting clearance between the confronting surfaces that may be about 6 mm or less. However, the resulting clearance between the confronting surfaces must still be sealed. It is believed that Current seal designs cannot be operably located in the low clearance installations.

Anticipated low tolerance, high production volume installations include vehicle components such as doors, hoods, frames and panels that may be formed by molding. Alternatively, extruding or stamping can be used to form these components. As the confronting surfaces will have greatly reduced tolerances, the resulting clearances in the assembled components are often substantially reduced. Further, these components are often movable between a first open position and a second closed or adjacent position, wherein the components in the closed position are located within restricted clearances. These restricted clearances are likely to be on the order of approximately 6 mm or less.

The present invention provides a seal for confronting, low tolerance components cooperatively employed to form low clearances. The present seal is employed with components having relatively small manufacturing tolerances, such as those manufactured by molding or stamping. An example of such low tolerance manufactured components are those formed of molded materials such as polycarbonate or other high strength plastic materials. Typical molded components include doors and frames for vehicles such as automobiles, buses, trucks, vans and SUVs.

The present invention provides for a sealed interface between the movable components forming confronting surfaces in a vehicle, wherein the dimension of the clearance or interface to be sealed is on the order of 6 mm or less. The present seal includes a dense cellular structure, a foamed in place urethane, an EPDM, a TPE or a urethane, a high density EPDM or resilient layer which is bonded or connected to the relevant portion of the confronting surface such as a door and/or a frame. The particular polycarbonate or the density of the EPDM is selected in part based upon the intended operating parameters of the seal.

It is contemplated manufacture of the seal may be accomplished by bonding the seal to the confronting surface, such as a door and/or the frame at the time of manufacture in the molding, stamping or extruding process that forms the door and/or frame. Alternatively, the seal may be laminated to the door or the frame to form a chemical bond therebetween. In alternative constructions, retention of the seal relative to the confronting surfaces can be accomplished through combined mechanical and chemical bonds as well as mechanical bonds such as pins.

BRIEF DESCRIPTION OF THE DRAWINGS

FIG. 6 is an enlarged cross sectional view of an alternative construction of the seal.

FIG. 7 is an enlarged cross sectional view of a further construction of the seal.

FIG. 8 is an enlarged cross sectional view of another construction of the seal.

FIG. 9 is an enlarged cross sectional view of a finned construction of the seal.

FIG. 10 is an enlarged cross sectional view of a further additional construction of the seal.

FIG. 11 is an enlarged cross sectional view of a further alternative construction of the seal.

FIG. 12 is an enlarged cross sectional view of an additional alternative construction of the seal.

FIG. 13 is an enlarged cross sectional view of an alternative fin construction of the seal.

FIG. 14 is an enlarged cross sectional view of a further fin construction of the seal.

DETAILED DESCRIPTION OF THE PREFERRED EMBODIMENTS

The present seal 10 may be employed between fixed components as well as movable components, wherein the components are movable between a first closed or adjacent position and a second spaced apart position. For purposes of description, the components are taken as movable components, manufactured with relatively low tolerances. Therefore, the clearance between the components in the adjacent (or closed) position is relatively small. Specifically, the present seal is configured to accommodate gaps of approximately 6 mm or less between confronting surfaces.

Figure 1:
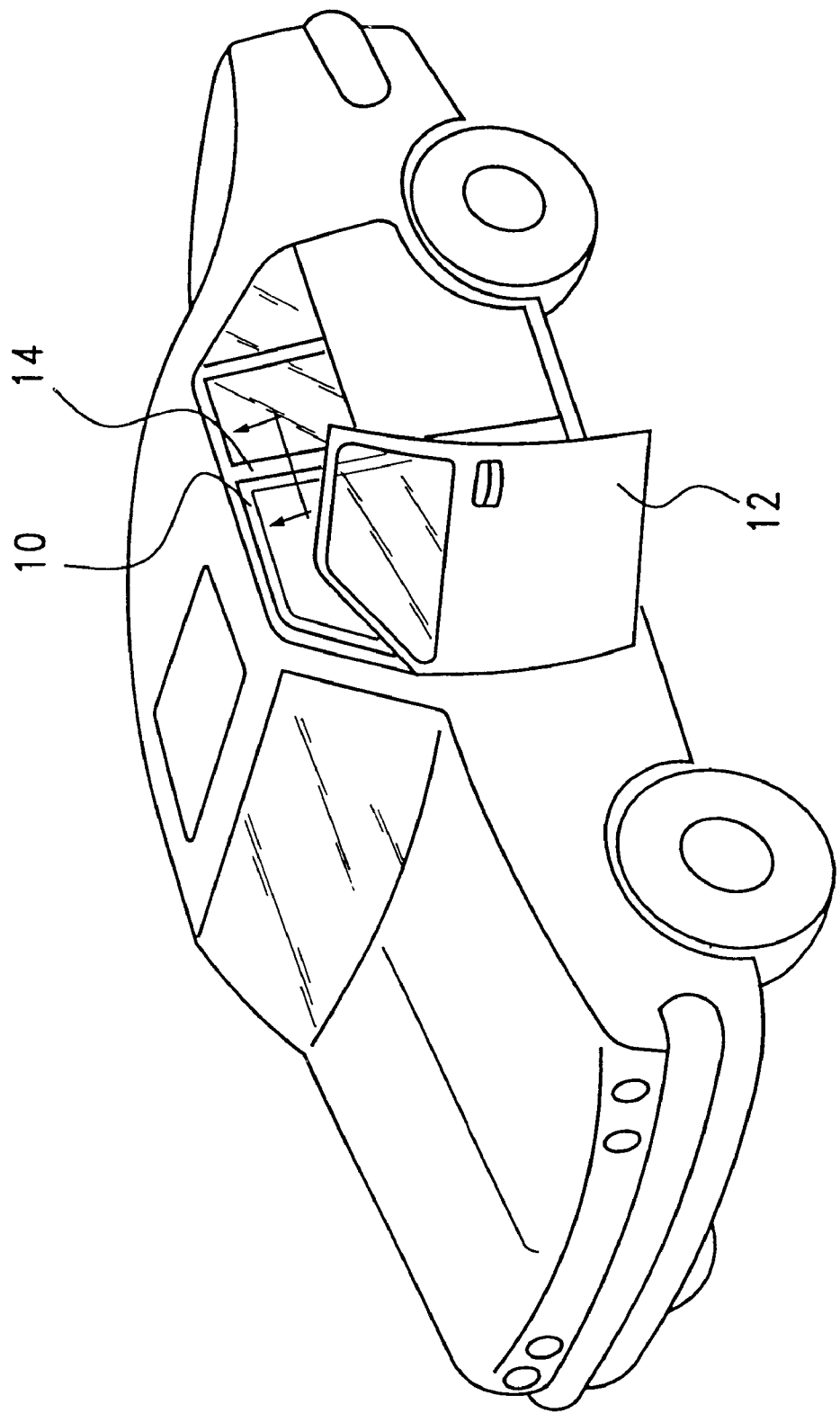
FIG. 1 is a perspective view of an automobile employing the present invention.
Figure 3:
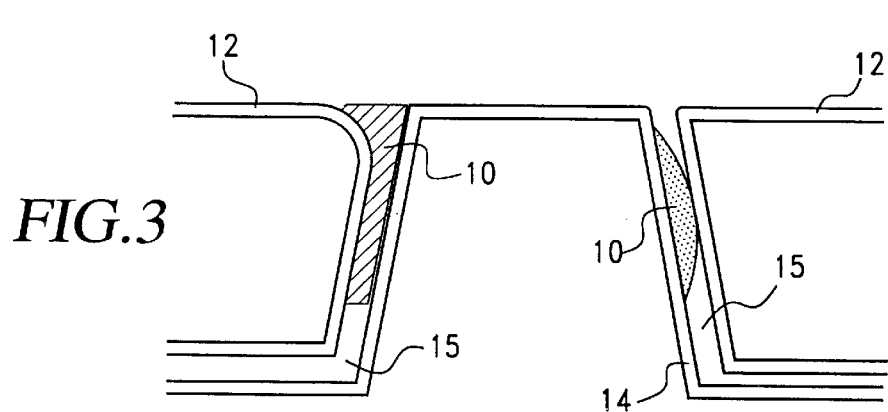
FIG. 3 is a cross sectional view taken along the cross section lines of FIG. 1 showing an alternative seal configuration.

It is understood the components may be located in any of a variety of installations in automotive vehicles, such as trucks, cars buses, vans and spoil utility vehicles, without limiting the scope of the invention. For purposes of describing a configuration of the invention, the installation will be operably located between confronting surfaces in an automotive vehicle, as shown in FIGS. 1 and 3. Although the seals 10 may be found between deck lids, sun roofs, hood-to-cowl, windows and doors, the present description is set forth in terms of confronting surfaces formed by a door 12 movable relative to a fixed frame 14. This description, of course, is intended to cover the previously set forth configurations as well as any further configurations employing a fixed component and a movable component, fixed components or two movable components.

The confronting surfaces may employ closure mechanisms that provide a coarse range of motion and a fine range of motion. These closure mechanisms typically have cammed travel for movement between a closed position and an ajar position providing the fine range of motion and a pivot or armature for the larger coarse range of motion.

Typically each of these configurations is characterized by the relatively low clearance between the confronting surfaces of the components in the adjacent or closed position. That is, generally a clearance of approximately 6 mm or less separates the components in the closed or adjacent position. The door 12 and the frame 14 are contemplated to move between a closed or adjacent position at which the components are at their nearest proximity to an open or spaced apart position where the components may be in a relatively "open" configuration, and the seal provides no function.

The available clearance between the door 12 and the frame 14 precludes use of the traditional compressible cellular structure including bulb and hollow type seals. While these seals have a relatively high degree of compressibility throughout a relatively large range and accommodate a relatively wide range of tolerances, in the low clearance (tolerance) environment, these seals represent an unacceptable quantity of material in the clearance. That is, the amount of seal material may preclude the components from assuming the closed position. In addition, the forces on the seal in the reduced clearance environment unacceptably contribute to failure of the seal. Reducing the relative size of a traditional seal construction does not provide an acceptable alternative.

Figure 2:
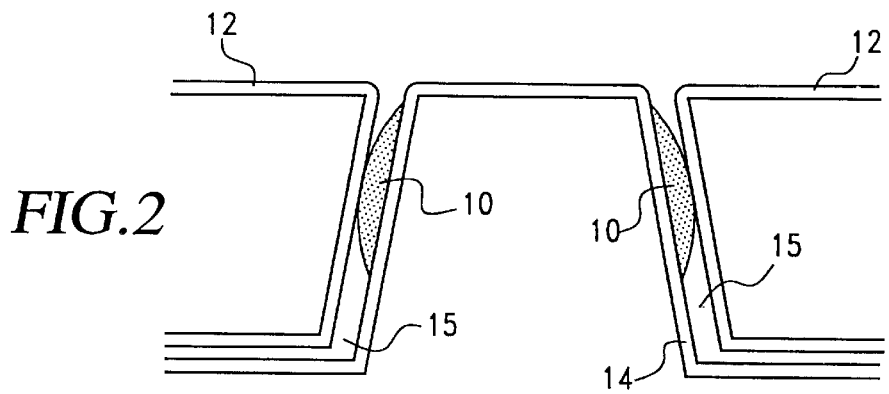
FIG. 2 is a cross sectional view taken along the cross section lines of FIG. 1 showing a first seal configuration.

As shown in FIG. 1, the present invention provides a seal 10 between confronting surfaces of the door 12 and the frame 14. Referring to FIG. 2, a clearance 15 formed between the confronting surfaces is sufficiently small to preclude use of traditional seals having a traditional engaging section and a sealing portion.

The present seal 10 is configured to accommodate the relatively high loading forces during closing and opening of the door 12 relative to the frame 14, while requiring a minimal space, typically 6 mm or less, for forming the seal. The seal 10 includes an anchor portion and a sealing portion. The scaling portion provides a sealed interface between the confronting surfaces in the closed position and the anchor portion retains the sealing portion relative to one of the confronting surfaces. In one construction, the anchor portion and the sealing portion are formed of the same material. That is, the seal 10 has a single durometer characteristic. Thus, the seal 10 can have a monolithic construction of a single composition, wherein the anchor portion and the sealing portion are integral and substantially coextensive. In such configuration, the sealing portion and the anchor portion can have a single uniform density. It is also understood the seal 10 can be foiled of a plurality of different materials, including but not limited to differing layers and coatings including slip coatings.

In a first configuration, the door 12 is formed of a plastic by any of a variety of means such as rotation molding, molded in place, injection molding, or even lost wax molding. The use of molding technology allows the door 12 to be formed with substantially smaller tolerances than traditional formed and bent components. That is, the deviation from nominal is substantially reduced. Therefore, the resulting clearances can be reduced.

Although it is not required, it is anticipated that the frame 14 or a portion of the frame may also be formed of a molded material to also reduce manufacturing variations. That is, the frame 14 can be formed by any of a variety of means such as rotation molding, molded in place, injection molding, or even lost wax molding.

Figure 4:
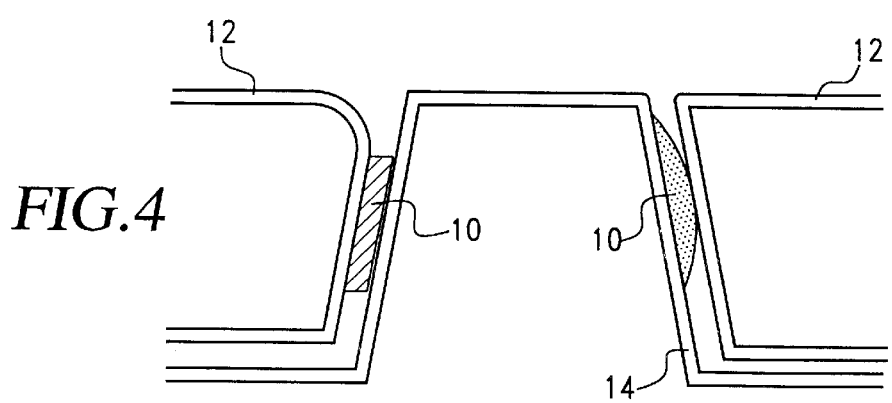
FIG. 4 is a cross sectional view taken along the cross section lines of FIG. 1 showing a further alternative seal configuration.
Figure 5:
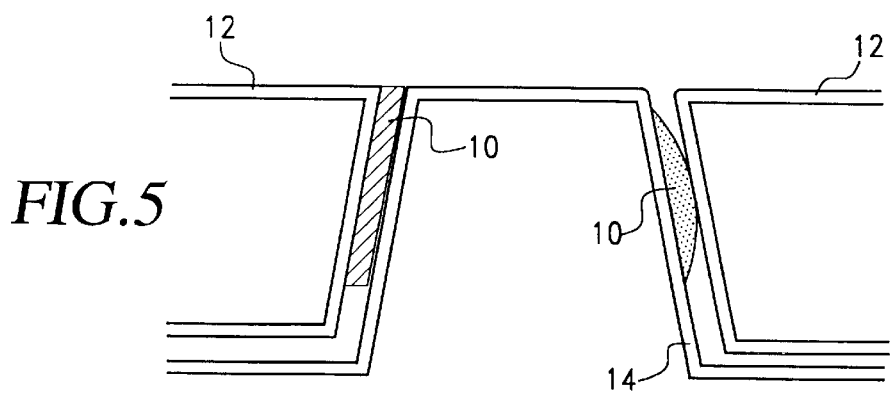
FIG. 5 is a cross sectional view taken along the cross section lines of FIG. 1 showing an additional seal configuration.

The seal 10 is disposed to be located in the clearance between the components in the closed or adjacent position at the interface of the door and the frame. The seal 10 may be located at any desired position or location in the clearance. As shown in FIGS. 2–5, the door 12 and the frame 14 can be constructed to exhibit a generally flush, or coplanar exterior relationship adjacent the clearance (FIGS. 2 and 5), or one of the door and the frame can be rounded (FIGS. 3 and 4). The seal 10 can be constructed to form a flush surface in either configuration of the door 12 and the frame 14. That is, the seal 10 provides a substantially continuous surface between the adjacent portions of the exterior surfaces. Alternatively, the seal 10 can be spaced from the exposed, outer or exterior surfaces of the door 12 and the frame 14, as seen in FIGS. 2 and 4.

While each of the FIGS. 2–5 shows two seals 10, it is noted the seals within any given FIGS. 2–5 are different. This difference does not limit the application of the seals, in that the seals 10 along the cross sectional line of FIG. 1, can be the same configuration or differing configurations. Thus, the seal 10 between the front door and the pillar can be a first configuration and the seal between the rear door and the pillar can be the same or a different configuration. It is understood that many applications employ similar seal configurations for the front door and the rear door.

Similarly, the profile of the front door and the rear door can be similar or dissimilar without changing the scope of the present invention. That is, as shown in each FIGS. 2–5, the seal 10 can be located as a flush mount, a recessed mount, in a rounded door or pillar, or a flush door and pillar. Any of the seal configurations can be employed in any combination with any of the door 12 or frame 14 configurations.

Preferably, the seal 10 is bonded to one of the confronting surfaces such as the frame 14 or the door 12. The seal thus has an anchor portion 13 and a sealing portion 17. The anchor portion 13 being that part connected to one of the confronting surfaces, and the sealing portion 17, being that portion that contacts the remaining confronting surface to form a seal there between. Typically, the seal 10 will be bonded to the plastic molded component. The retention of the seal 10 is sufficient to preclude unintended separation of the seal from the door 12 or the frame 14 during use. In a preferred construction, the seal 10 is sufficiently connected to the respective door 12 or frame 14 to substantially preclude non-destructive separation. The seal 10 can be bonded or connected to the door 12 or the frame 14. Alternatively, a portion of the seal 10 can be bonded or connected to the door 12 and a remaining portion of the seal can be bonded or connected to the frame 14.

The bonding of the seal 10 to the respective component may be accomplished by any of a variety of mechanisms including secondary adhesives such as adhesive tape manufactured by Minnesota Manufacturing & Mining. Alternatively, the seal 10 may be bonded to the component during formation of the component. It is further understood the seal 10 can be connected by sputtering, painting or spraying.

Alternatively, as shown in FIG. 6, the frame 14 or the door 12 may include a seal seat 22 such as a channel, recess or groove into which a portion of the seal is disposed. For example, a "C" channel may be employed, wherein the seal 10 is retained in the channel. It is also contemplated that a mechanical bond can be formed by staples, pins or other means to locate the seal 10 relative to the confronting surface.

Referring to FIGS. 7 and 8, the seal 10 may include an inclined surface 24 to assist in occluding the gap between the confronting surfaces. Although shown on an enlarged scale, the profile of the seal 10 remains within the 6 mm clearance between the confronting surfaces. The inclined surface 24 can be any of a variety of configurations including wedge, saw tooth, apexed or intersecting facets.

Referring to FIGS. 10–12, the seal 10 can include one or a plurality of curvilinear surfaces 40. The curvilinear surfaces 40 can be adjacent or spaced apart. The curvilinear surfaces 40 can include a constant or a varying radius. Alternatively, as shown in FIGS. 9, 13 and 14, the seal 10 may include a multi finger 28 profile. The sizing of the fingers 28 is selected to preclude an accumulation of material that would preclude the confronting surfaces from being disposed in the closed position. Referring to FIG. 9, the fingers 28 can be substantially perpendicular to the adjacent portion of the door 12 or frame 14. Alternatively, as seen in FIGS. 13 and 14, the fingers 28 can be inclined relative to the door 12 or frame 14. The fingers 28 can be sized to be elongate or have a reduced length to become effectively a rib. The number of fingers 28 is at least partially dictated by the sizing of the fingers, the material of the fingers and the clearance. As shown in FIG. 14, the fingers 28 can be sized and spaced such that upon complete compression against the door 12 (or frame 14) the fingers do not overlap. That is, only a single thickness of the fingers 28 can accumulate between the confronting surfaces.

Figure 15:
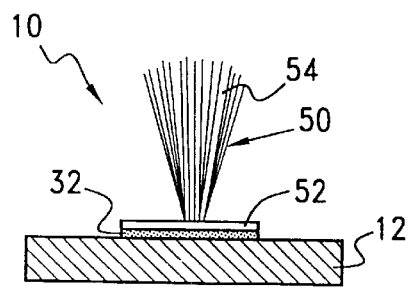
FIG. 15 is an enlarged cross sectional view of an adhered pile construction of the seal.
Figure 16:
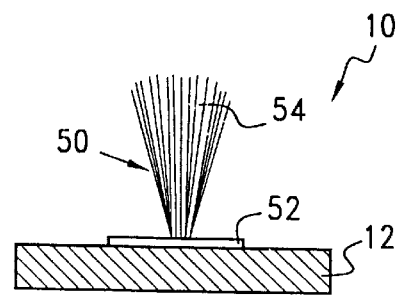
FIG. 16 is an enlarged cross sectional view of an alternative pile construction of the seal.
Figure 17:
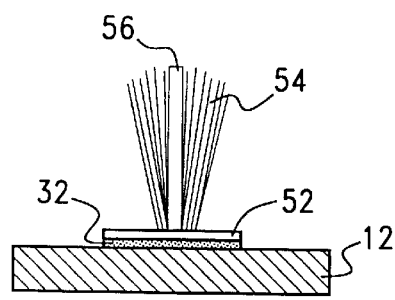
FIG. 17 is an enlarged cross sectional view of a pile construction of the seal having an embedded barrier.
Figure 18:
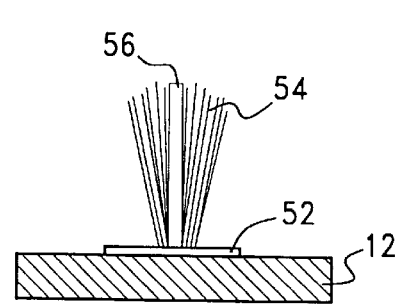
FIG. 18 is an enlarged cross sectional view of an alternative pile construction of the seal having an embedded barrier.

As shown in FIGS. 15–18, it is also contemplated the seal 10 can be in the form of a pile strip 50. The pile strip 50 typically includes a backing 52 and a multitude of projecting fibers 54. The pile strip 50 can be formed with or without a barrier 56. The barrier 56 can project from the backing 52 a distance substantially equal to the height of the pile fibers 54, less than the height of the pile fibers or further than the height of the pile fibers. Referring to FIGS. 15 and 17, the pile strip 50 can be connected to the door 12 or the frame 14 by the adhesive layer 32. Alternatively, as seen in FIGS. 16 and 18, the backing 52 can be attached to the door 12 or the frame 14 by an integral connection such as melt bonding. That is, if the backing 52 is formed of a thermoplastic, the backing can be sufficiently heated to partially melt and thus bond to the door 12 or the frame 14.

Figure 19:
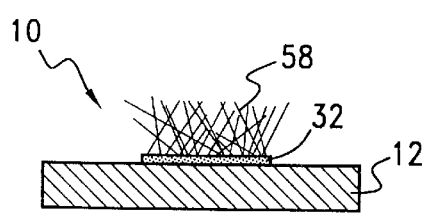
FIG. 19 is an enlarged cross sectional view of a flocked construction of the seal.
Figure 20:
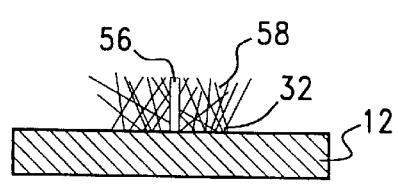
FIG. 20 is an enlarged cross sectional view of an alternative flocked construction of the seal.
Figure 21:
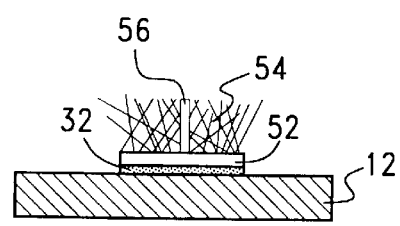
FIG. 21 is an enlarged cross sectional view of a flocked backing construction of the seal.
Figure 22:
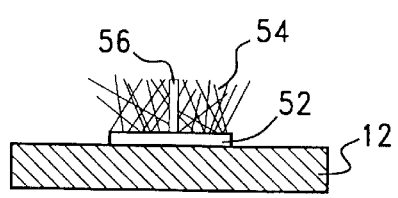
FIG. 22 is an enlarged cross sectional view of an alternative flocked backing construction of the seal.

Referring to FIG. 19, the seal 10 can be a flock 58 connected to either the door 12 or the frame 14. The flock 58 can be connected to the door 12 or the frame 14 by the adhesive layer 32 or connected by molding in place or processes as discussed herein. As shown in FIG. 20, the seal 10 can include the flock 58 as well as a barrier 56. It is also contemplated as seen in FIGS. 21 and 22 that the flocked seal, with or without the barrier 56 can include a backing 52. Alternatively, the backing 52 can be adhered, or bonded, for example by melt bonding, to the door 12 or the frame 14.

The seal 10 may be formed from a variety of materials but it is anticipated that a relatively high density EPDM or a dense cellular structure, a foamed in place urethane, a TPE or a urethane, or a resilient layer polycarbonate may be employed. Thus, the seal 10 can be formed of a single material, wherein the material is the combination of a plurality of components, such as TPE, fillers and coloring agents. However, it is understood that depending upon the method of forming the seal, the seal 10 can have a laminate structure created during formation of the seal or the confronting surface.

In view of the relatively low clearances, the seal 10 is either directly connected or bonded to the one of the confronting surfaces such as the door 12 or the frame 14. Alternatively, as shown in FIGS. 15, 17 and 21, it is contemplated that the adhesive layer 32 may be employed to secure the seal 10 to the confronting surface. However, the adhesive layer 32 is subject to the drawbacks of added cost and occupying a portion of the limited space in the clearance. Thus, it is anticipated that fasteners such as screws, bolts or rivets will not be employed further, the use of a clamping or crimping structure is not employed. In addition, the traditional use of employing a friction fit and relying upon resilient figures or barbs to retain the seal is not employed.

A portion of the seal 10 may be bonded to the door 12 and a second portion of the seal may be bonded to the frame 14, wherein the seals contact in the closed position of the confronting surfaces.

In a further configuration, the door 12 may support one section of the seal 10 and the frame 14 may support a further section or adjacent section of the seal such that in the closed position the two seals do not contact along a sealing interface but merely longitudinally abut along a length of the sealed interface. It is also understood that each component may include a portion of the resulting seal 10, such that upon disposing the components in the closed position the separate portions of the seals are brought into contact and form the sealed interface.

Manufacture

It is contemplated the seals 10 may be operably located relative to the confronting surfaces by any of a variety of methods. It is understood the seal 10 could be formed on either or both of the confronting surfaces. In addition, the invention is not limited to the particular confronting surface. That is, the seal 10 can be formed on the door 12, the frame 14 or any other section of the vehicle.

One possible method includes molding the seal 10 in place during formation of the door 12 to form a single whole structure. That is, a monolithic structure. For example, in injection molding or rotation molding, the seal material may be disposed in predetermined locations in the mold. The material forming the door 12 is then introduced into the mold to contact the located seal 10. Thus, the seal 10 is accurately located and may have an extremely thin cross section.

Alternatively, the mold may be constructed so that the seal 10 has an enhanced thickness in specific regions by recessing corresponding portion of the door 12, wherein the combined door and seal profile is identical to that of a constant thickness seal. That is, the seal 10 may be preformed or cast into the mold, wherein the component is subsequently formed.

It is contemplated the seal 10 may be bonded to one of the confronting surfaces such as the door 12 or the frame 14 by use of a chemical material such as adhesives, epoxy, acrylic adhesives or glue.

Alternatively, the tolerances may be such that the seal 10 may be sprayed or sputtered onto predetermined locations of the frame 14 or the door 12. The sputtering or spraying may be accomplished in a single pass application. Alternatively, the application of the seal 10 may be accomplished through a plurality of passes or applications, as at least partially dictated by the particular seal material and intended operating environment. Thus, the seal 10 can be formed with differing thicknesses along a length of the seal.

The seal 10 may also be laminated onto a bonding material, which in turn is adhered to the respective portion of the door 12 or the frame 14. If pins or staples are used, the pins or staples connect the seal 10 to the respective door 12 or frame 14.

Further, if portions of the door 12 or the frame 14 are formed through an extrusion process, the seal 10 may be extruded simultaneously or sequentially with the frame or door portion to locate the seal on the door or the frame. Typically, heat bonding may be readily accomplished by these extruding procedures as known in the art.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

I claim:

1. A seal assembly for operable location between a door and a frame in a vehicle, the door and the frame movable between an open position and a closed position, the seal assembly comprising:
    (a) an anchor portion integral with the door or the frame to form a one piece construction; and
    (b) a sealing portion connected to the anchor portion and sized to be operably located in the clearance and contact a remaining one of the door or the frame.

2. The seal assembly of claim 1, wherein the anchor portion and the sealing portion are the same material.

3. The seal assembly of claim 1, wherein the anchor portion and the door or the frame are formed of the same material.

4. A seal assembly for operable location between two confronting surfaces in a vehicle opening, the confronting surfaces being one of a door vehicle and a vehicle frame and movable between an open position and a closed position, the seal assembly comprising a sealing portion integrally connected to one of the confronting surfaces to form a monolithic structure.

5. The seal assembly of claim 4, wherein the sealing portion is extruded.

6. The seal assembly of claim 4, wherein the sealing portion is molded.

7. The seal assembly of claim 4, wherein the sealing portion is formed by sputter deposition.

8. The seal assembly of claim 4, wherein the confronting surfaces are spaced by less than approximately 10 mm in the closed position.

9. The seal assembly of claim 4, wherein the confronting surfaces are spaced by less than approximately 6 mm in the closed position.

10. The seal assembly of claim 4, wherein the sealing portion is chemically connected to the confronting surface.

11. The seal assembly of claim 4, wherein the sealing portion is sufficiently connected to the confronting surface to preclude non destructive separation.

12. The seal assembly of claim 4, wherein the sealing portion is formed of a single material.

13. A seal assembly for operable location between two confronting surfaces in a vehicle opening, the confronting surfaces being one of a vehicle door and a vehicle frame, and movable between an open position and a closed position, the seal assembly comprising, a seal body integrally connected to one of the confronting surfaces by one of extension, molding, sputtering or spraying to form a monolithic construction.

14. The seal assembly of claim 13, wherein the seal body is formed of a single material.

15. The seal assembly of claim 13, wherein the seal body is formed of a single durometer material.

16. The seal assembly of claim 13, wherein the seal body is connected to the confronting surface to preclude non destructive separation.

17. A seal assembly for operable location between two confronting surfaces in a vehicle opening, the confronting surfaces being one of a vehicle door and a vehicle frame, and movable between an open position and a closed position, seal assembly comprising a seal portion, the seal portion and the confronting surface being a one piece construction.

18. The seal assembly of claim 17, wherein the seal portion is connected to the confronting surface to preclude non destructive separation.

19. The seal assembly of claim 17, wherein the seal portion and the confronting surface are molded.

20. The sealing assembly of claim 17, wherein the seal portion is chemically connected to the confronting surface.

21. The seal assembly of claim 17, wherein the confronting surface is molded.

22. The seal assembly of claim 17, wherein the seal portion is a single durometer material.

23. A seal assembly for operable location between two confronting surfaces in a vehicle opening, the confronting surfaces movable between an open position and a closed position, the confronting surfaces defining a corresponding pair of spaced apart exterior surfaces in the closed position, the seal assembly comprising:

(a) an anchor portion connected to one of the confronting surfaces to preclude non destructive separation; and (b) a sealing portion sized to be operably located in the clearance and contact a remaining confronting portion, at least one of the anchor portion and the sealing portion selected to define a substantially continuous planar surface extending between the spaced apart exterior surfaces in the closed position.

24. The seal assembly of claim 1, wherein the sealing portion includes one of a flock and a plurality of pile fibers.

25. The seal assembly of claim 24, wherein the sealing portion further comprises a barrier.

26. The seal assembly of claim 4, wherein the sealing portion includes one of a flock and a plurality of pile fibers.

27. The seal assembly of claim 26, wherein the sealing portion further comprises a barrier.

28. The seal assembly of claim 13, further comprising one of a plurality of fiber and a flock.

29. The seal assembly of claim 28, further comprising a barrier.

* * * * *

UNITED STATES PATENT AND TRADEMARK OFFICE
CERTIFICATE OF CORRECTION

PATENT NO. : 6,367,865 B1
DATED : April 9, 2002
INVENTOR(S) : Royse, Marion A.

It is certified that error appears in the above-identified patent and that said Letters Patent is hereby corrected as shown below:

<u>Column 8,</u>
Line 39, for the word reading "scaling" should read -- sealing --.
Line 49, for the word reading "extension" should read -- extrusion --.

Signed and Sealed this

Nineteenth Day of August, 2003

JAMES E. ROGAN
*Director of the United States Patent and Trademark Office*